(12) United States Patent
Nakajima (10) Patent No.: US 10,325,494 B2
(45) Date of Patent: Jun. 18, 2019

(54) ROUTE GUIDANCE DEVICE AND ROUTE GUIDANCE METHOD

(71) Applicant: Nissan Motor Co., Ltd., Yokohama-shi, Kanagawa (JP)

(72) Inventor: Toshiharu Nakajima, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/747,377

(22) PCT Filed: Jul. 27, 2015

(86) PCT No.: PCT/JP2015/071215
§ 371 (c)(1),
(2) Date: Jan. 24, 2018

(87) PCT Pub. No.: WO2017/017755
PCT Pub. Date: Feb. 2, 2017

(65) Prior Publication Data
US 2018/0211533 A1 Jul. 26, 2018

(51) Int. Cl.
*G08G 1/0968* (2006.01)
*G01C 21/34* (2006.01)
(Continued)

(52) U.S. Cl.
CPC ... G08G 1/096855 (2013.01); G01C 21/3492 (2013.01); G01C 21/3655 (2013.01);
(Continued)

(58) Field of Classification Search
CPC .... G08G 1/096855; G08G 1/00; G08G 1/167; G01C 21/3492; G01C 21/3655;
(Continued)

(56) References Cited

U.S. PATENT DOCUMENTS 6,269,304 B1 * 7/2001 Kaji ............... G01C 21/3658
342/70
8,234,064 B2 7/2012 Oonishi et al.
(Continued)

FOREIGN PATENT DOCUMENTS

EP 2775262 A1 9/2014
JP 2004185504 A 7/2004
(Continued)

OTHER PUBLICATIONS

Fukuyasu, JP 2004185504, Jul. 2, 2004 (machine translation).*
Sano, JP 2009025071, Feb. 5, 2009 (machine translation).*

*Primary Examiner* — Courtney D Heinle
(74) *Attorney, Agent, or Firm* — Young Basile Hanlon & MacFarlane, P.C.

(57) ABSTRACT

A route guidance unit includes: a position detection unit configured to detect a position of a host vehicle and a travel lane; a determination unit configured to determine whether the host vehicle should change the travel lane detected by the position detection unit to another lane so as to travel toward a branch point or an intersection on the travel route; and a guide unit configured to provide guidance to change lanes, wherein, when the determination unit determines that the host vehicle should change the travel lane to other lanes sequentially several times, the guide unit provides first guidance at a point at which a distance from the position of the host vehicle to the branch point is shorter than a distance obtained such that a predetermined distance is multiplied by the number of lane changes.

8 Claims, 5 Drawing Sheets

(51) Int. Cl.
*G01C 21/36* (2006.01)
*G05D 1/00* (2006.01)
*G05D 1/02* (2006.01)
*G08G 1/00* (2006.01)
*G08G 1/16* (2006.01)
*B60R 21/00* (2006.01)

(52) U.S. Cl.
CPC ....... *G01C 21/3658* (2013.01); *G05D 1/0088* (2013.01); *G05D 1/0274* (2013.01); *G05D 1/0278* (2013.01); *G08G 1/00* (2013.01); *G08G 1/167* (2013.01); *B60R 21/00* (2013.01); *G05D 2201/0213* (2013.01)

(58) Field of Classification Search
CPC ............. G01C 21/3658; G05D 1/0088; G05D 1/0274; G05D 1/0278; G05D 2201/0213; B60R 21/00
See application file for complete search history.

(56) References Cited

U.S. PATENT DOCUMENTS

| | | | |
|---|---|---|---|
| 8,335,641 B2 | 12/2012 | Nakayama et al. | |
| 2007/0124069 A1* | 5/2007 | Nakayama | G01C 21/3644 701/423 |
| 2007/0124072 A1 | 5/2007 | Nakayama et al. | |
| 2009/0326814 A1* | 12/2009 | Harumoto | G01C 21/3655 701/414 |
| 2010/0223002 A1 | 9/2010 | Oonichi et al. | |
| 2012/0191344 A1* | 7/2012 | Iao | G01C 21/3658 701/436 |
| 2013/0103304 A1* | 4/2013 | Nishibashi | G01C 21/3655 701/410 |
| 2014/0088862 A1* | 3/2014 | Simon | G01C 21/30 701/431 |
| 2014/0350845 A1* | 11/2014 | Hayashi | G01C 21/3438 701/428 |
| 2015/0160034 A1* | 6/2015 | Kim | G06K 9/00798 701/410 |
| 2015/0241232 A1* | 8/2015 | Park | G08G 1/166 701/412 |
| 2017/0320521 A1* | 11/2017 | Fujita | B62D 6/00 |
| 2018/0099676 A1* | 4/2018 | Goto | B60W 30/10 |

FOREIGN PATENT DOCUMENTS

| | | |
|---|---|---|
| JP | 2006226956 A | 8/2006 |
| JP | 2007155341 A | 6/2007 |
| JP | 2007155351 A | 6/2007 |
| JP | 2007178357 A | 7/2007 |
| JP | 3966170 B2 | 8/2007 |
| JP | 2009014555 A | 1/2009 |
| JP | 2009025071 A | 2/2009 |
| JP | 2009133801 A | 6/2009 |
| JP | 2010038630 A | 2/2010 |
| RU | 2400710 C1 | 9/2010 |

* cited by examiner

| LANE CHANGE NUMBER REQUIRED FROM TRAVEL LANE TO BRANCH POINT | GUIDANCE POINT FOR LANE CHANGE | | |
|---|---|---|---|
| | FIRST GUIDANCE POINT | WHEN STILL SHOULD CHANGE TO LANE TO TRAVEL AT BRANCH POINT | |
| | | SECOND GUIDANCE POINT | THIRD GUIDANCE POINT |
| ONCE | 1-KM POINT BEHIND BRANCH POINT | – | – |
| TWICE | 1.5-KM POINT BEHIND BRANCH POINT | 1-KM POINT BEHIND BRANCH POINT | – |
| THREE TIMES | 2-KM POINT BEHIND BRANCH POINT | 1.5-KM POINT BEHIND BRANCH POINT | 1-KM POINT BEHIND BRANCH POINT |

ROUTE GUIDANCE DEVICE AND ROUTE GUIDANCE METHOD

TECHNICAL FIELD

The present invention relates to a route guidance device and a route guidance method.

BACKGROUND

Navigation devices for indicating travel routes to destinations are known. Japanese Patent Application Publication No. 2009-133801 discloses a navigation device that, when there is a branch point on a travel route, indicates a distance to the branch point and directs a host vehicle to a lane to travel upon approaching the branch point.

According to the navigation device disclosed in Japanese Patent Application Publication No. 2009-133801, a driver can recognize the lane to travel when approaching the branch point, but is confused as to which point is appropriate to change lanes. When the driver is required to change lanes several times to reach the branch point but misses the timing of the lane change, the driver may fail to cross over to the branch lane to travel in the appropriate direction. If the driver changes to the branch lane at an earlier point, the host vehicle then should keep traveling on an overtaking lane for a long distance.

SUMMARY

The present invention has been made in view of the conventional problems. An object of the present invention is to provide a route guidance device and a route guidance method for informing a driver of an appropriate point to change lanes.

A route guidance device according to an aspect of the present invention detects a position of a host vehicle and a travel lane, retrieves per lane the travel route to the destination from the position of the host vehicle, determines whether the host vehicle should change the detected travel lane to another lane several times so as to travel toward a branch point on the travel route, provides guidance to change lanes depending on the position of the host vehicle and the travel lane, and when it is determined that the host vehicle should change the travel lane to other lanes sequentially several times, provides first guidance at a point at which a distance from the position of the host vehicle to the branch point is longer than a predetermined distance and is shorter than the distance obtained such that a predetermined distance is multiplied by a number of lane changes. The predetermined distance is from a point of last guidance provided by the guide unit to the branch point. A lane where first guidance is provided and a lane where last guidance is provided are different.

The present invention can inform the driver of an appropriate point to change lanes.

DETAILED DESCRIPTION OF THE EMBODIMENTS

An embodiment of the present invention will be described below with reference to the drawings. The same elements in the descriptions of the drawings are designated by the same reference numerals, and explanations thereof are not repeated below.

Figure 1:
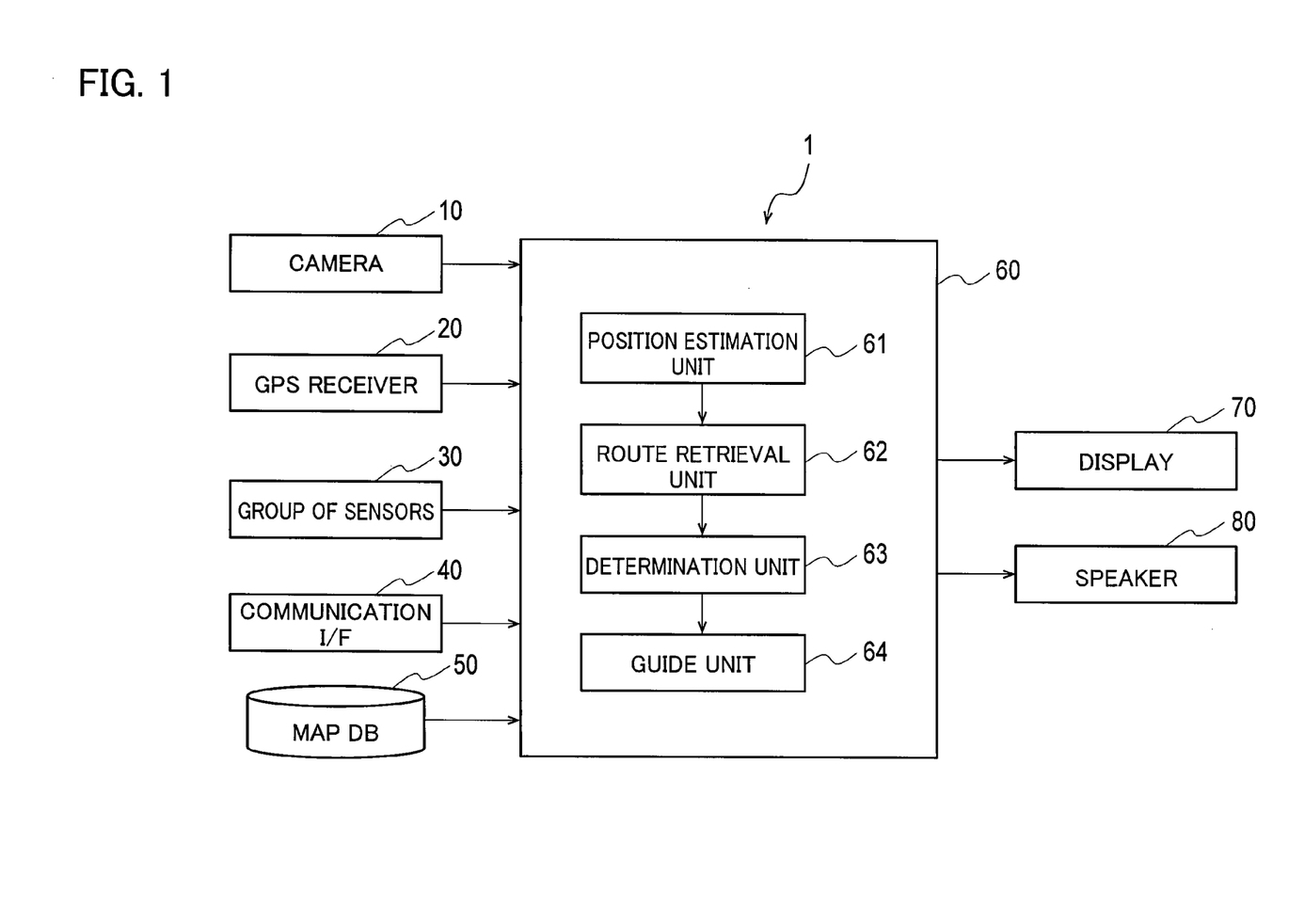
FIG. 1 is a configuration diagram of a route guidance device according to an embodiment of the present invention.

A route guidance device 1 according to the present embodiment is described below with reference to FIG. 1. As shown in FIG. 1, the route guidance device 1 includes a camera 10, a GPS receiver 20, a group of sensors 30, a communication I/F 40, a map database 50, a navigation device 60, a display 70 which provides a vehicle occupant with various pieces of information, and a speaker 80 which outputs speech sounds to inform the occupant of the information.

The camera 10 (a position detection unit) is a camera including an imaging device such as a charge-coupled device (CCD) and a complementary metal oxide semiconductor (CMOS), and images views in front of the host vehicle. The camera 10 has an image processing function and detects objects such as white lines from captured images. The camera 10 outputs the detected data to the navigation device 60. The camera 10 may be installed at a position where peripheral views can be captured, instead of front views.

The GPS receiver 20 (a position detection unit) receives radio waves from a satellite so as to detect a current position of the host vehicle on the ground. The GPS receiver 20 outputs the detected current position of the host vehicle to the navigation device 60.

The group of sensors 30 (a speed detection unit) includes a speed sensor, an acceleration sensor, and a gyro sensor. The group of sensors 30 detects a speed, a rate of acceleration, and an attitude of the host vehicle by the respective sensors, and outputs the detected data to the navigation device 60.

The communication I/F 40 (an information detection unit) is a communication device which wirelessly communicates signals with external devices. The communication I/F 40 externally receives various pieces of information, such as traffic information including traffic congestion and traffic restrictions, and weather information, through an intelligent transport system (ITS) which transmits various data in real time. The ITS includes Vehicle Information and Communication System (VICS: registered trademark) and telematics. The communication I/F 40 outputs the received information to the navigation device 60.

The map database 50 stores map information including road information and facility information. The map database 50 stores various kinds of data required for route guidance, such as road data and icon data indicated on a map. The road data stored in the map database 50 includes information about the number of lanes of roads, widths of roads, undulations of roads, and the like.

The navigation device 60 determines a travel route to a destination preliminarily set by the occupant. In particular, the navigation device 60 indicates a travel route to a destination on the display 70 or a mark denoting the current position of the host vehicle retrieved by use of the positional information acquired from the GPS receiver 20, the information acquired from the communication I/F 40, the map information acquired from the map database 50, and the like.

The navigation device 60 is a computer including a CPU, ROM and RAM, and a data path and an input/output interface connecting these elements. The CPU implements predetermined processing in accordance with programs stored in the ROM. The navigation device 60 functionally includes a position estimation unit 61, a route retrieval unit 62, a determination unit 63, and a guide unit 64.

The position estimation unit 61 estimates a current position of the host vehicle per lane. In particular, the position estimation unit 61 estimates the current position of the host vehicle per lane by use of the information about white lines acquired from the camera 10, the positional information acquired from the GPS receiver 20, and the map information acquired from the map database 50.

The route retrieval unit 62 retrieves per lane a travel route to a destination starting from the current position of the host vehicle estimated by the position estimation unit 61 by use of the map information stored in the map database 50. The route retrieval unit 62 may retrieve the travel route per lane at regular intervals, since a retrieval load increases when the travel route to the destination is retrieved per lane constantly. For example, the retrieval unit 62 may retrieve the travel route per lane when a distance to a branch point or an intersection reaches three kilometers. The distance is not limited to three kilometers and may be any distance sufficient for the host vehicle to change lanes in advance. Alternatively, the retrieval unit 62 may retrieve the travel route per lane per kilometer. The distance is not limited to one kilometer when the retrieval load can be reduced.

The determination unit 63 determines whether the host vehicle should change the current traveling lane to another lane so as to travel in an appropriate direction at a branch point or an intersection. For example, the determination unit 63 determines that the host vehicle does not need a lane change when the host vehicle is traveling in a single-lane road. In a case in which the host vehicle is traveling in a two-lane road, the determination unit 63 determines that the host vehicle does not need a lane change when the host vehicle is traveling on the appropriate side, or determines that the host vehicle should cross over to the other lane when the current lane is not the appropriate lane that the host vehicle should be traveling. The determination unit 63 thus determines that the host vehicle should change lanes when there are two or more lanes and the host vehicle is not in an appropriate lane to travel.

The guide unit 64 provides route guidance to travel at a branch point or an intersection on a travel route. For example, the guide unit 64 leads the host vehicle to an appropriate lane at a branch point where a road is branching into two directions, or leads the host vehicle to go straight, turn left, or turn right at an intersection.

The display 70 indicates a travel route to a destination set by the navigation device 60.

The speaker 80 outputs speech sounds to inform the occupant of a direction to a destination along a travel route or a direction at a branch point or an intersection.

Figures 2A, 2B:
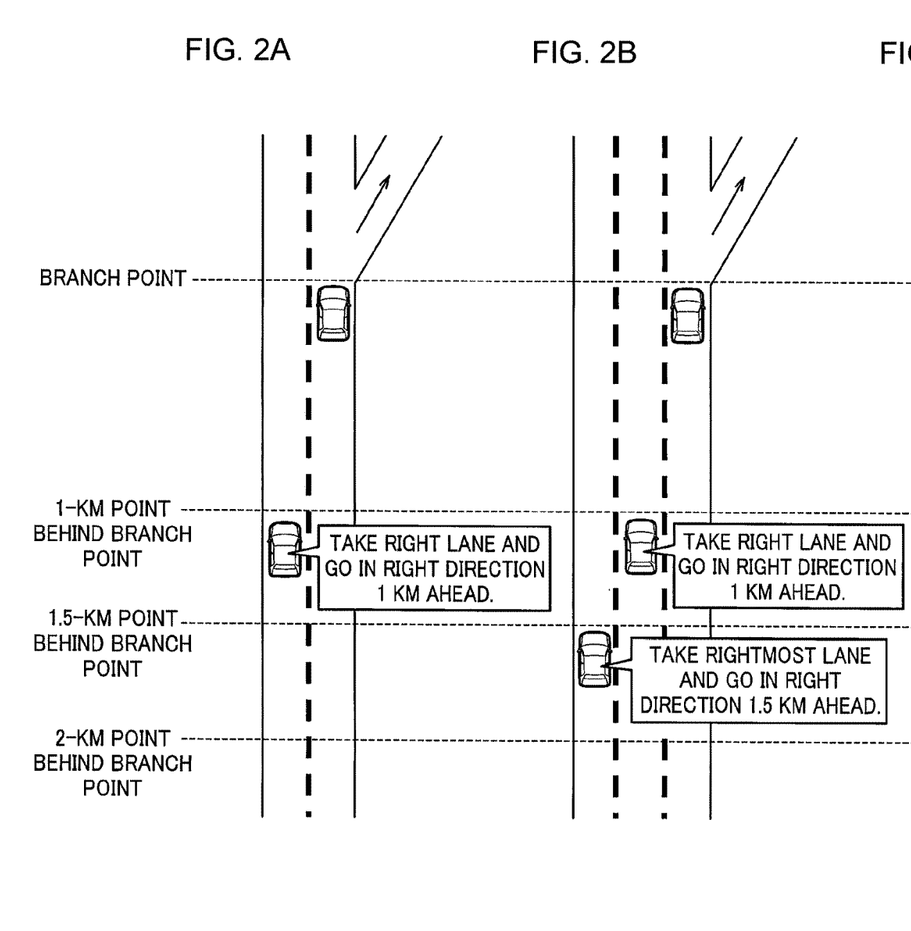
FIG. 2(a) to FIG. 2(c) are views for illustrating operations of the route guidance device according to the embodiment of the present invention.
Figure 2C:
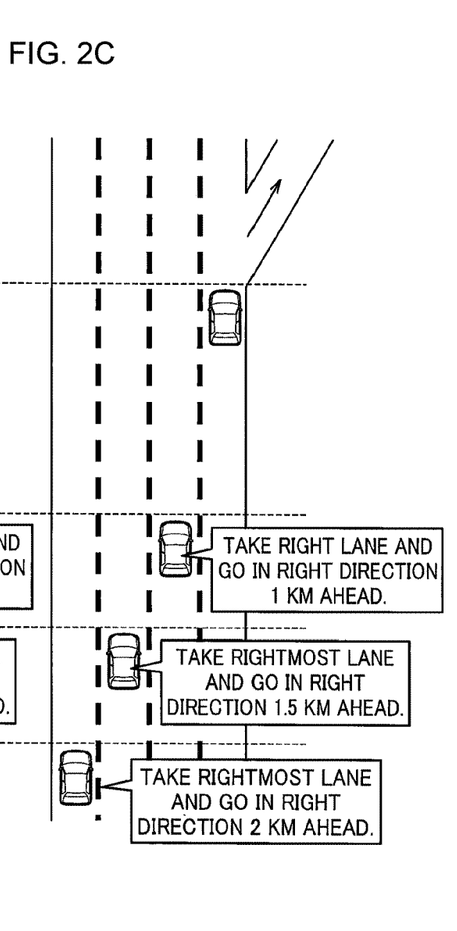

Next, examples of operations of the route guidance device 1 configured as described above are described with reference to FIG. 2 and FIG. 3. FIG. 2(*a*) to FIG. 2(*c*) are illustrated with a case in which a lane of a road branching into a right direction is set as a travel route.

An example of an operation in a two-lane road is described below with reference to FIG. 2(*a*). As shown in FIG. 2(*a*), when the host vehicle is approaching a branch point, the route retrieval unit 62 retrieves a travel route per lane. The determination unit 63 then determines whether the host vehicle should cross over to the other lane so as to travel in the right direction at the branch point. As shown in FIG. 2(*a*) and FIG. 3, when the host vehicle is traveling in the left lane and should change the lanes once to travel in the right direction at the branch point, and the distance from the current position of the host vehicle to the branch point reaches a first predetermined distance (for example, one kilometer), the guide unit 64 informs the driver, "Take the right lane, and go in the right direction one kilometer ahead." The guide unit 64 thus can inform the driver of the point appropriate to change the lanes so as to travel in the right direction at the branch point. The first predetermined distance is not limited to one kilometer and may be any distance which is sufficient for the driver to change lanes safely.

An example of an operation in a three-lane road is described below with reference to FIG. 2(*b*). As shown in FIG. 2(*b*), when the host vehicle is approaching a branch point, the route retrieval unit 62 retrieves a travel route per lane, as in the case of FIG. 2(*a*). The determination unit 63 then determines whether the host vehicle should change lanes so as to travel in the right direction at the branch point. As shown in FIG. 2(*b*) and FIG. 3, when the host vehicle is traveling in the leftmost lane and should change the lanes twice to travel in the right direction at the branch point, and the distance from the current position to the branch point reaches a second predetermined distance (for example, 1.5 kilometers), the guide unit 64 informs the driver, "Take the rightmost lane, and go in the right direction 1.5 kilometers ahead."

The determination unit 63 then determines whether the host vehicle still should change the lanes to travel in the right direction at the branch point. As shown in FIG. 2(*b*) and FIG. 3, when the host vehicle is traveling in the central lane and should change the lanes once more to travel in the right direction at the branch point, and the distance from the current position to the branch point reaches the first predetermined distance, the guide unit 64 provides the second guidance to inform the driver, "Take the right lane, and go in the right direction one kilometer ahead."

In the example shown in FIG. 2(*b*), the first guidance point is the 1.5-kilometer point behind the branch point shorter than the two-kilometer point behind the branch point. The first guidance point is a point at which the distance from the current position to the branch point is shorter than a distance obtained such that the first predetermined distance is multiplied by two which is the number of lane changes (namely, two kilometers). Namely, when the host vehicle should sequentially change lanes twice, the guide unit 64 provides the first guidance at the point at which the distance from the current position to the branch point is shorter than the distance obtained such that the first predetermined distance is multiplied by two which is the number of lane changes. The guide unit 64 thus can inform the driver of the point appropriate to change the lanes so as to travel in the right direction at the branch point. Since the first guidance point is the 1.5-kilometer point behind the branch point shorter than the two-kilometer point behind the branch point, the driver can avoid keeping traveling in the rightmost overtaking lane for a long distance, while ensuring a sufficient distance for a lane change.

In the example shown in FIG. 2(*b*), the distance from the first guidance point to the second guidance point is 500 meters. The distance from the second guidance point to the branch point is one kilometer. The second guidance point is the last guidance point. The distance from the last guidance point to the branch point is longer than the distance from the first guidance point to the last guidance point. The guidance provided at the respective points as described above allows the driver to ensure a sufficient distance for changing lanes. The distance from the first guidance point to the last guidance point is shorter than the distance from the last guidance point to the branch point. The guidance provided at the respective points as described above can prevent the driver from keeping traveling in the rightmost overtaking lane for a long distance.

Figure 3:
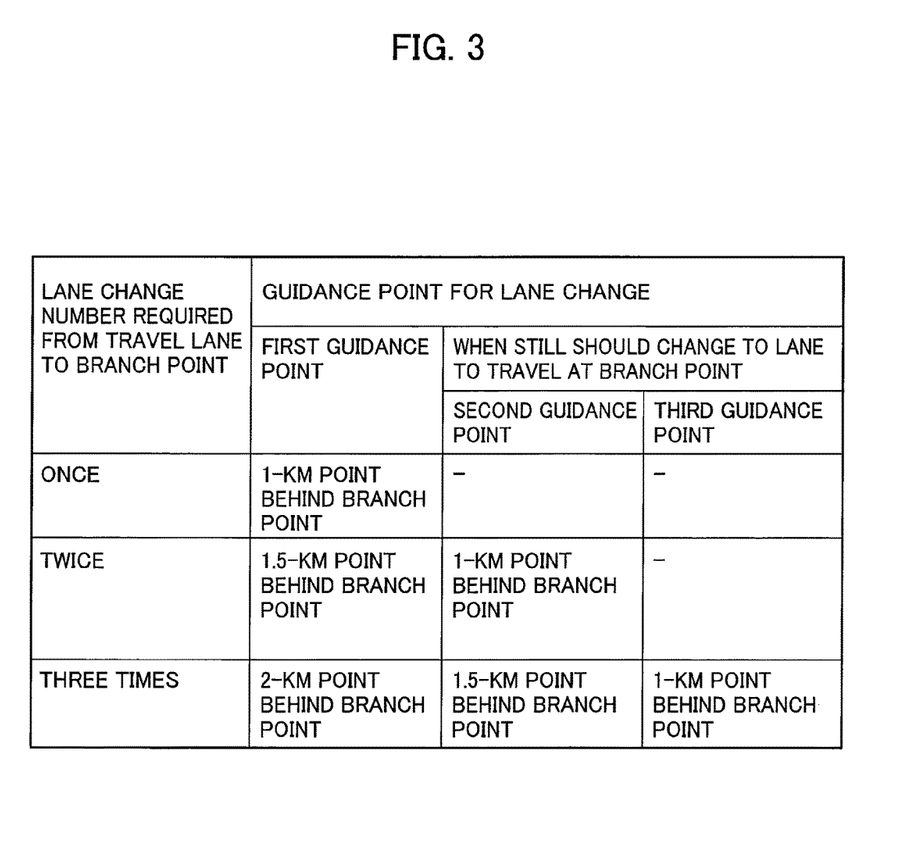
FIG. 3 is a table for illustrating operations of the route guidance device according to the embodiment of the present invention.

An example of an operation in a four-lane road is described below with reference to FIG. 2(c). As shown in FIG. 2(c), when the host vehicle is approaching a branch point, the route retrieval unit 62 retrieves a travel route per lane, as in the case of FIG. 2(a). The determination unit 63 then determines whether the host vehicle should change lanes so as to travel in the right direction at the branch point. As shown in FIG. 2(c) and FIG. 3, when the host vehicle is traveling in the leftmost lane and should sequentially change the lanes three times so as to travel in the right direction at the branch point, and the distance from the current position to the branch point reaches a third predetermined distance (for example, two kilometers), the guide unit 64 informs the driver, "Take the rightmost lane, and go in the right direction two kilometers ahead."

The determination unit 63 then determines whether the host vehicle still should change the lanes to travel in the right direction at the branch point. As shown in FIG. 2(c) and FIG. 3, when the host vehicle is traveling on the left side of the two central lanes and should change the lanes two more times so as to travel in the right direction at the branch point, and the distance from the current position to the branch point reaches the second predetermined distance, the guide unit 64 provides the second guidance to inform the driver, "Take the rightmost lane, and go in the right direction 1.5 kilometers ahead."

The determination unit 63 then determines whether the host vehicle still should change the lanes to travel in the right direction at the branch point. As shown in FIG. 2(c) and FIG. 3, when the host vehicle is traveling on the right side of the two central lanes and should change the lanes once more so as to travel in the right direction at the branch point, and the distance from the current position to the branch point reaches the first predetermined distance, the guide unit 64 provides the third guidance to inform the driver, "Take the right lane, and go in the right direction one kilometer ahead."

In the example shown in FIG. 2(c), the first guidance point is the two-kilometer point behind the branch point shorter than the three-kilometer point behind the branch point. The first guidance point is a point at which the distance from the current position to the branch point is shorter than a distance obtained such that the first predetermined distance is multiplied by three which is the number of lane changes (namely, three kilometers). Namely, when the host vehicle should sequentially change lanes three times, the guide unit 64 provides the first guidance at the point at which the distance from the current position to the branch point is shorter than the distance obtained such that the first predetermined distance is multiplied by three which is the number of lane changes. The guide unit 64 thus can inform the driver of the point appropriate to change the lanes so as to travel in the right direction at the branch point. Since the first guidance point is the two-kilometer point behind the branch point shorter than the three-kilometer point behind the branch point, the driver can avoid keeping traveling in the rightmost overtaking lane for a long distance, while ensuring a sufficient distance for a lane change.

In the example shown in FIG. 2(c), the distance from the first guidance point to the second guidance point is 500 meters. The distance from the second guidance point to the third guidance point is 500 meters. The distance from the third guidance point to the branch point is one kilometer. The third guidance point is the last guidance point. The distance from the last guidance point to the branch point is longer than the distance from the first guidance point to the second guidance point and the distance from the second guidance point to the last guidance point. The guidance provided at the respective points as described above allows the driver to ensure a distance sufficient to change lanes. The distance from the first guidance point to the second guidance point and the distance from the second guidance point to the last guidance point are each shorter than the distance from the last guidance point to the branch point. The guidance provided at the respective points as described above can prevent the driver from keeping traveling in the rightmost overtaking lane for a long distance.

The example shown in FIG. 2(c) is illustrated with the case in which the second predetermined distance is set at 1.5 kilometers, and the third predetermined distance is set at two kilometers. Although the distance from the first guidance point to the second guidance point and the distance from the second guidance point to the third guidance point are each set at 500 meters, the example is not limited to this case as described above. For example, as shown in FIG. 4, the second predetermined distance may be set at 1.6 kilometers so that the guidance intervals increase as the host vehicle is approaching the branch point.

Figure 4:
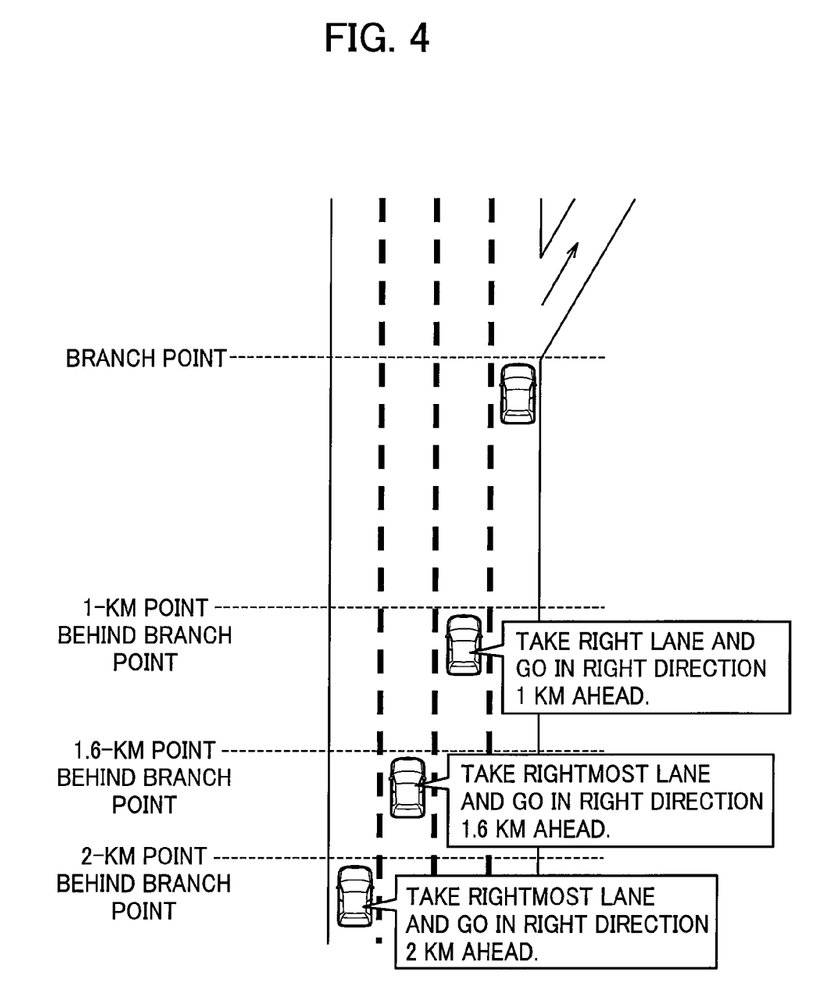
FIG. 4 is a view for illustrating another operation of the route guidance device according to the embodiment of the present invention.

As shown in FIG. 4, when the second predetermined distance is set at 1.6 kilometers, the distance from the first guidance point (the first point) to the second guidance point (the second point) is 400 meters. The distance from the second guidance point to the third guidance point (the third point) is 600 meters. The distance from the third guidance point to the branch point is one kilometer, which is the same as the example shown in FIG. 2(c).

When the second predetermined distance is set at 1.6 kilometers, the distance from the first guidance point to the second guidance point is shorter than the distance from the second guidance point to the third guidance point. The distance from the second guidance point to the third guidance point is shorter than the distance from the third guidance point to the branch point. The gradual increase in the guidance intervals as the host vehicle is approaching the branch point can prevent the driver from keeping traveling in the rightmost overtaking lane for a long distance, while ensuring a sufficient distance for a lane change.

Figure 5:
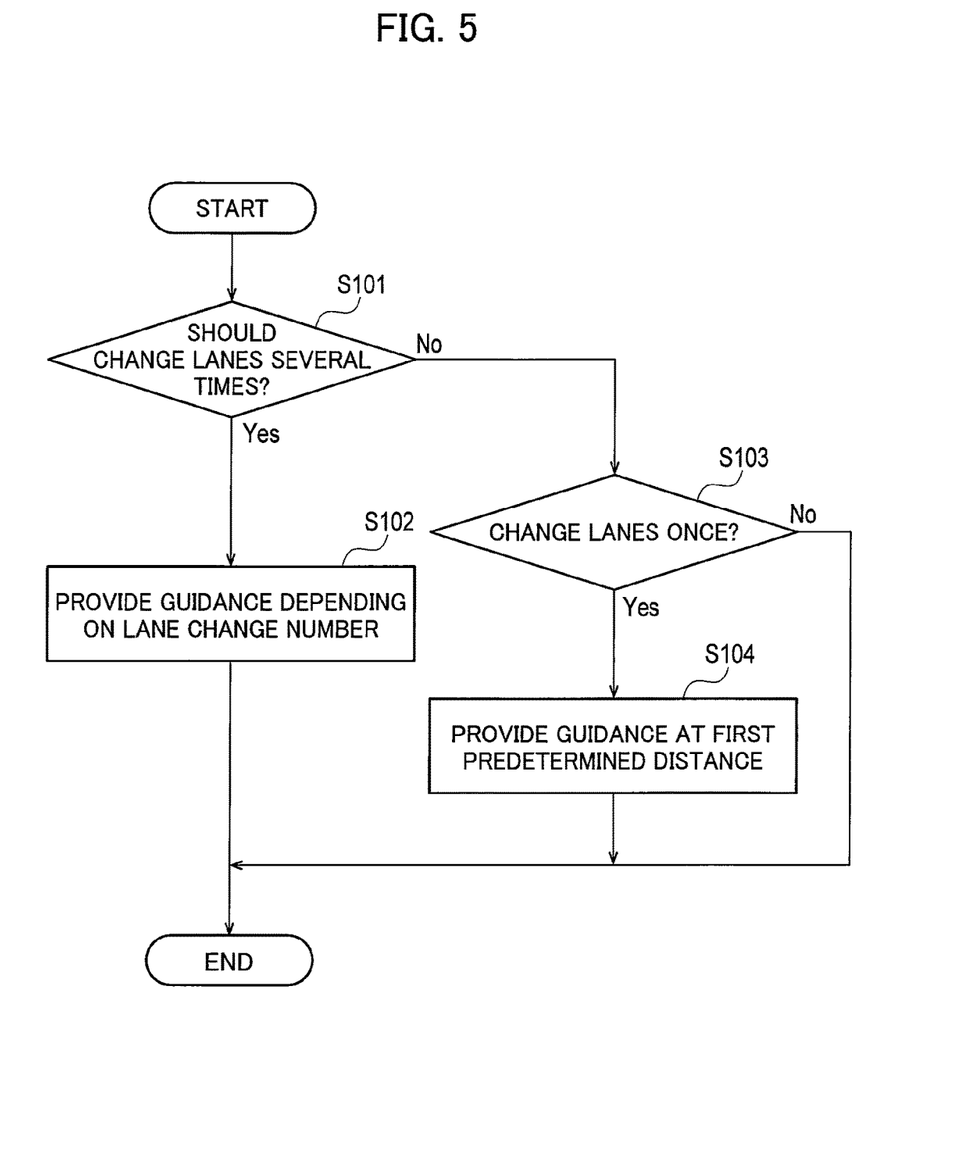
FIG. 5 is a flow chart for illustrating an operation of the route guidance device according to the embodiment of the present invention.

Next, an example of the operation of the route guidance device 1 according to the present embodiment is described with reference to the flow chart shown in FIG. 5. The process shown in the flow chart starts when a travel route to a destination is set.

In step S101, the determination unit 63 determines whether the host vehicle should change lanes several times so as to travel in an appropriate direction at a branch point. When the host vehicle should change lanes several times (Yes in step S101), the process proceeds to step S102. When the host vehicle does not need to change lanes several times (No in step S101), the process proceeds to step S103.

In step S102, the guide unit 64 provides the first guidance at a point at which the distance from the current position to the branch point is longer than the first predetermined distance and shorter than a distance obtained such that the first predetermined distance is multiplied by the number of lane changes. The guide unit 64 provides additional guidance as necessary depending on the current position of the host vehicle.

In step S103, the determination unit 63 determines whether the host vehicle should change the lanes once so as to travel in the appropriate direction at the branch point. When the host vehicle should change the lanes once (Yes in step S103), the process proceeds to step S104. When the host vehicle does not need a lane change (No in step S103), the process is finished.

In step S104, the guide unit 64 provides the guidance at a point at which the distance from the current position to the branch point reaches the first predetermined distance.

As described above, the route guidance device 1 according to the present embodiment can achieve the following advantageous effects.

The route guidance device 1 determines whether the host vehicle should change lanes several times so as to travel in an appropriate direction at a branch point. When the host vehicle should change lanes several times, the route guidance device 1 provides the first guidance at a point at which a distance from a current position to the branch point is longer than a first predetermined distance and shorter than a distance obtained such that the first predetermined distance is multiplied by the number of lane changes. The route guidance device 1 thus can inform the driver of an appropriate point to change lanes so as to travel in an appropriate direction at the branch point.

The route guidance device 1 also provides the first guidance at a point at which a distance from the current position to the next guidance point is shorter than a distance from the last guidance point to the branch point. The route guidance device 1 thus can inform the driver of an appropriate point to change lanes so as to travel in an appropriate direction at the branch point or the intersection.

The route guidance device 1 gradually increases the guidance intervals as the host vehicle is approaching the branch point. The route distance device 1 thus can inform the driver of appropriate points to change lanes so as to travel in an appropriate direction at the branch point or the intersection. The guidance provided as described above can prevent the driver from keeping traveling in the rightmost overtaking lane for a long distance, while ensuring a sufficient distance for a lane change.

While the embodiment of the present invention has been described above, it should be understood that the present invention is not intended to be limited to the descriptions and the drawings composing part of this disclosure. Various alternative embodiments, examples, and technical applications will be apparent to those skilled in the art according to this disclosure.

For example, the route guidance device 1 may change guidance points depending on a speed of the host vehicle. When the host vehicle is traveling in an expressway around a speed limit, route guidance provided at an earlier point in front of a branch point increases the safety. The route guidance device 1 may set the first predetermined distance, the second predetermined distance, and the third predetermined distance described with reference to FIG. 2(c) at 1.25 kilometers, 1.75 kilometers, and 2.25 kilometers, respectively, so as to provide the route guidance at earlier points. When the speed of the host vehicle is as slow as 20 km/h, the route guidance device 1 may provide route guidance at later points.

The route guidance device 1 may change guidance points depending on the circumferential conditions of the host vehicle. For example, when traffic is congested, the route guidance device 1 may provide guidance at earlier points. Accordingly, the route guidance device 1 can reduce the risk that the host vehicle misses traveling in an appropriate direction at a branch point.

The route guidance device 1 may suspend the subsequent guidance until a predetermined time has passed since the previous lane change. For example, the driver does not necessarily change lanes immediately after the guidance is provided at the 1.5-kilometer point behind the branch point in the example shown in FIG. 2(b). The driver may change the lanes at a point slightly in front of the one-kilometer point behind the branch point. The subsequent guidance provided immediately after the lane change may annoy the driver. The route guidance device 1 thus provides the subsequent guidance after a predetermined time has passed since the previous lane change, so as to avoid annoying the driver with such immediate guidance. The predetermined time may be set at 10 seconds, or the subsequent guidance may be provided after the host vehicle travels 100 meters.

The route guidance device 1 may limit the number of times that guidance is provided. The driver may feel annoyed with repeated guidance informed. For example, the route guidance device 1 sets the number of times that guidance is provided at three times or less. Accordingly, the route guidance device 1 can avoid annoying the driver with excessive guidance.

Although the present embodiment exemplified the case in which the map database 50 is stored in the route guidance device 1, the map database 50 may be stored on a server. When the map database 50 is stored on the server, the navigation device 60 can acquire the map information on demand through communications.

The present invention is applicable to an autonomous vehicle which is autonomously driven along a travel route. When the present invention is applied to an autonomous vehicle, the autonomous vehicle autonomously changes lanes at the points set as described above, so as to travel in an appropriate direction at a branch point. When the autonomous vehicle is traveling in an expressway around a speed limit or traffic is congested, the points for changing lanes may be autonomously shifted to earlier points.

REFERENCE SIGNS LIST

10 CAMERA
20 GPS RECEIVER
63 DETERMINATION UNIT
64 GUIDE UNIT

The invention claimed is:

1. A route guidance device used for a vehicle which provides a travel route to a predetermined destination or an autonomous vehicle which is autonomously driven along the travel route, the route guidance device comprising:
   a position detection sensor configured to detect a position of a host vehicle and a travel lane;
   a route retrieval processor configured to retrieve per lane the travel route to the destination from the position of the host vehicle detected by the position detection sensor;
   a determination processor configured to determine whether the host vehicle should change several lanes so as to travel toward a branch point or an intersection on the travel route; and
   a guide processor configured to provide guidance to change lanes depending on the position of the host vehicle and the travel lane, wherein, when the determination processor determines that the host vehicle should sequentially change several lanes, the guide processor provides first guidance at a point at which a distance from the position of the host vehicle to the branch point is longer than a predetermined distance and is shorter than a distance obtained such that the predetermined distance is multiplied by a number of lane changes, wherein the predetermined distance is from a point of last guidance provided by the guide processor to the branch point, and wherein a lane where the first guidance is provided and a lane where the last guidance is provided are different.

2. The route guidance device according to claim 1, wherein the guide processor provides first guidance to change lanes at the point at which the distance from the position of the host vehicle to the branch point is longer than the predetermined distance and is shorter than the distance obtained such that the predetermined distance is multiplied by a number of lane changes, wherein the predetermined distance is from the point of last guidance to change lanes provided by the guide processor to the branch point, and wherein the guide processor provides the first guidance to change lanes and the last guidance to change lanes toward the branch point based on the travel lane.

3. The route guidance device according to claim 1, wherein a distance from the point of the first guidance to a point of subsequent guidance provided by the guide processor is shorter than a distance from a point of last guidance provided by the guide processor to the branch point.

4. The route guidance device according to claim 1, wherein a distance from a first point of guidance to a second point of subsequent guidance provided by the guide processor is shorter than a distance from the second point to a third point of subsequent guidance provided by the guide processor.

5. The route guidance device according to claim 1, further comprising:

a speed detection sensor configured to detect a speed of the host vehicle; and an information detection processor configured to detect traffic congestion information on a periphery of the host vehicle, wherein the guide processor changes a guidance start point depending on the speed detected by the speed detection sensor or the traffic congestion information detected by the information detection processor.

6. The route guidance device according to claim 1, wherein the guide processor provides subsequent guidance after a lapse of a predetermined time period when a lane change is detected by the position detection sensor.

7. The route guidance device according to claim 1, wherein the guide processor limits a number of times that guidance is provided.

8. A route guidance method used for a vehicle which provides a travel route to a predetermined destination or an autonomous vehicle which is autonomously driven along the travel route, the route guidance method comprising:

detecting a position of a host vehicle and a travel lane;

retrieving per lane the travel route to the destination from the position of the host vehicle;

determining whether the host vehicle should change several lanes so as to travel toward a branch point on the travel route;

providing guidance to change lanes depending on the position of the host vehicle and the travel lane; and when it is determined that the host vehicle should sequentially change several lanes, providing first guidance at a point at which a distance from the position of the host vehicle to the branch point is longer than a predetermined distance and is shorter than a distance obtained such that a predetermined distance is multiplied by a number of lane changes, wherein the predetermined distance is from a point of last guidance to the branch point, and wherein a lane where the first guidance is provided and a lane where last guidance is provided are different.

* * * * *